United States Patent [19]

Beswick et al.

[11] Patent Number: 4,812,955
[45] Date of Patent: Mar. 14, 1989

[54] MODULAR SHOCK RESISTANT/SEALED MULTI-FUNCTION LAMP

[75] Inventors: John H. Beswick, Jamestown; Bradley C. VanRiper, Kennedy, both of N.Y.

[73] Assignee: Truck-Lite Co., Inc., Falconer, N.Y.

[21] Appl. No.: 180,562

[22] Filed: Apr. 12, 1988

[51] Int. Cl.⁴ .............................................. F21V 1/00
[52] U.S. Cl. ..................................... 362/240; 362/61; 362/267; 362/306; 362/390
[58] Field of Search .................. 362/61, 80, 267, 310, 362/227, 226, 236, 237, 238, 239, 240, 235, 374, 375, 390, 801, 362, 293, 367; 340/84, 87, 89

[56] References Cited

U.S. PATENT DOCUMENTS

| 2,191,353 | 2/1940 | Poblocki | 362/236 |
| 3,321,731 | 5/1937 | Goldbaum . | |
| 4,437,145 | 3/1984 | Roller et al. | 362/306 |
| 4,447,859 | 5/1984 | Raczynski . | |
| 4,511,953 | 4/1985 | Fage . | |
| 4,532,578 | 7/1985 | Gaden et al. | 362/80 |

FOREIGN PATENT DOCUMENTS

| 1034563 | 7/1958 | Fed. Rep. of Germany | 362/240 |
| 2207473 | 6/1974 | France | 362/227 |
| 2502294 | 9/1982 | France | 362/61 |
| 563898 | 6/1957 | Italy | 362/310 |
| 957093 | 5/1964 | United Kingdom | 362/240 |
| 2091864 | 8/1982 | United Kingdom | 362/61 |

*Primary Examiner*—Ira S. Lazarus
*Assistant Examiner*—D. M. Cox
*Attorney, Agent, or Firm*—Mason, Fenwick & Lawrence

[57] ABSTRACT

A modular multi-function lamp assembly of plural shock mount lamps for automotive vehicles, such as trucks, trailers and the like, made up of interchangeable lamp modules, including a generally cup-shaped assembly housing having walls defining an outwardly opening cavity for receiving a plurality of individual lamp modules in a vertical stacked array aligned with each other and nested within the cavity. Each module includes a case having sides and a lens, a lamp bulb and shock mount therein, with at least one side forming a flat planiform abutment wall to be disposed in confronting abutment with a paired companion like abutment wall of an adjacent module. The abutment walls have interlocking formation to restrain them in assembled relationship, and the modules have protruding rib formations along opposite sides to be received in recessed channels in sides of the housing for holding the modules in the housing.

20 Claims, 5 Drawing Sheets

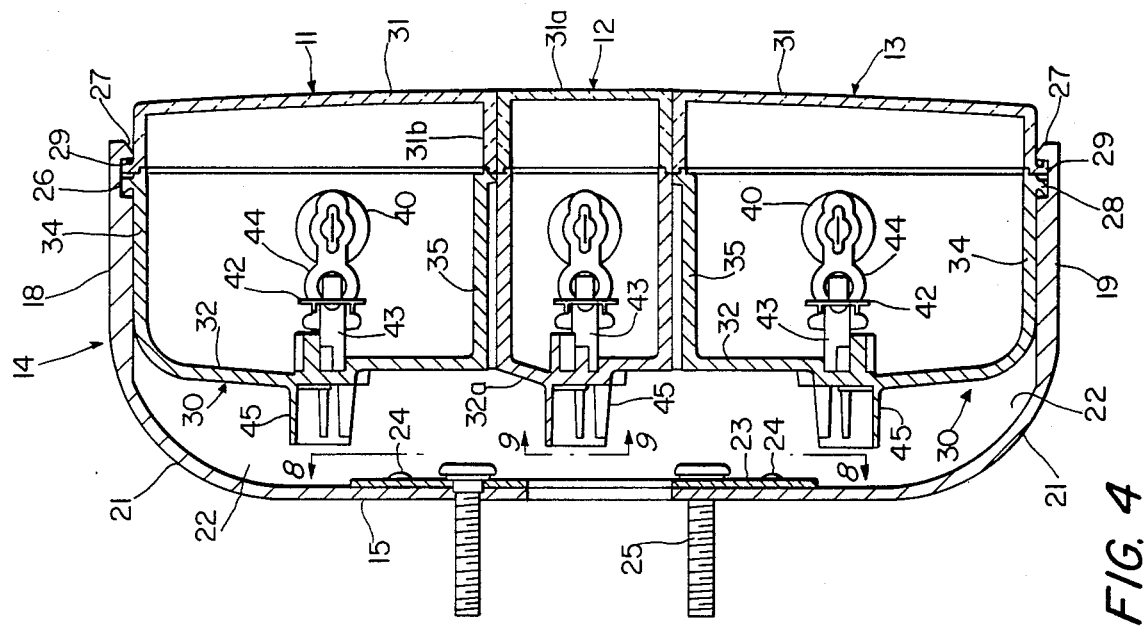
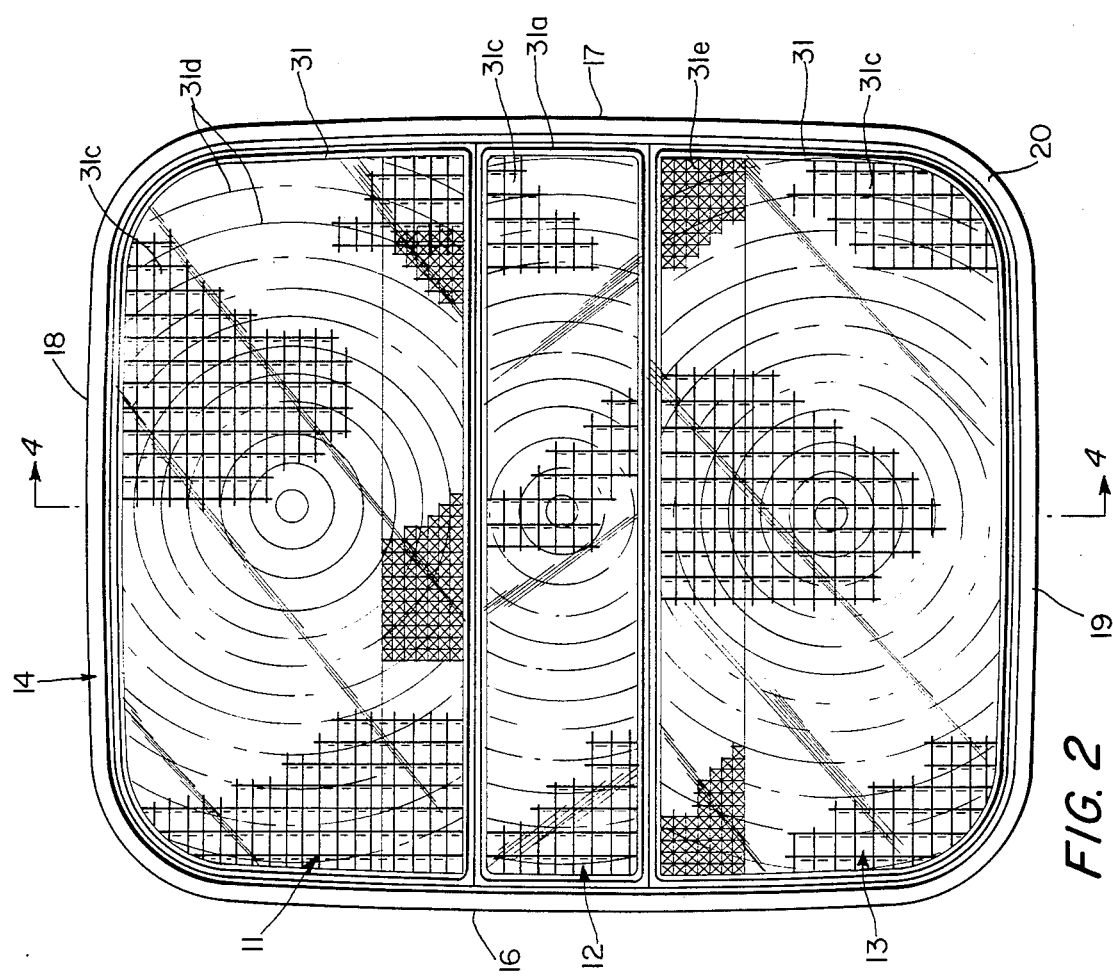

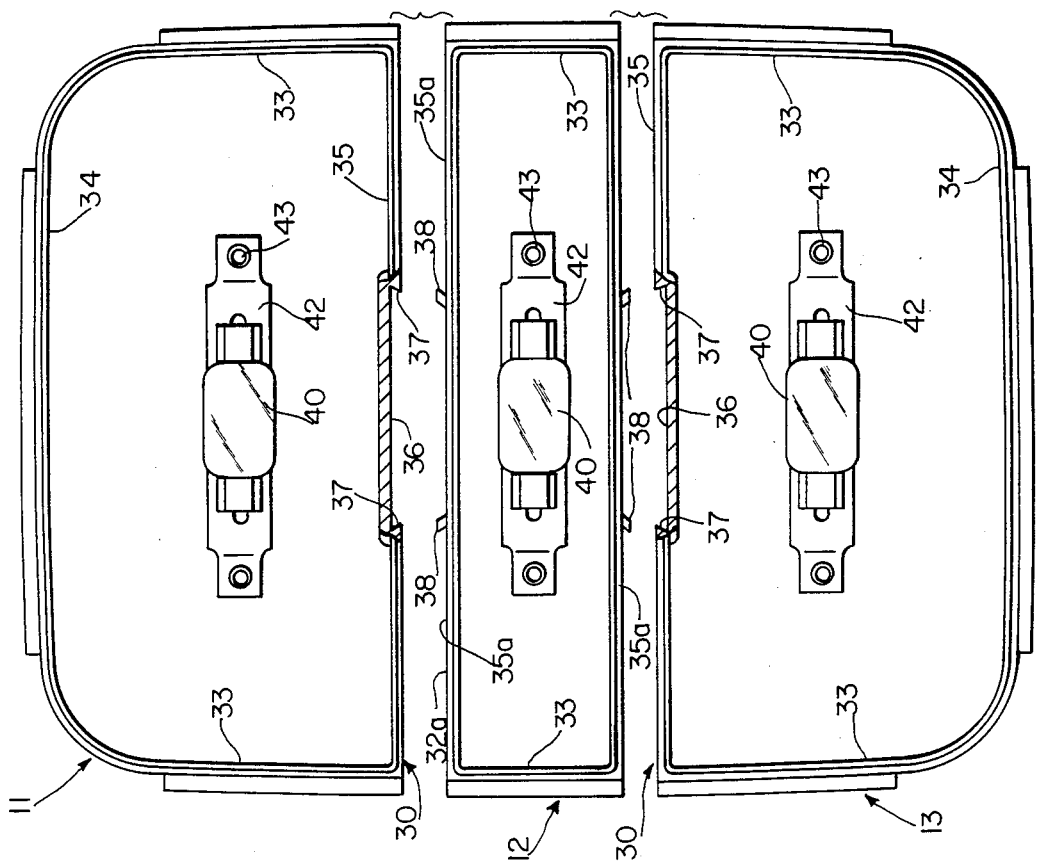
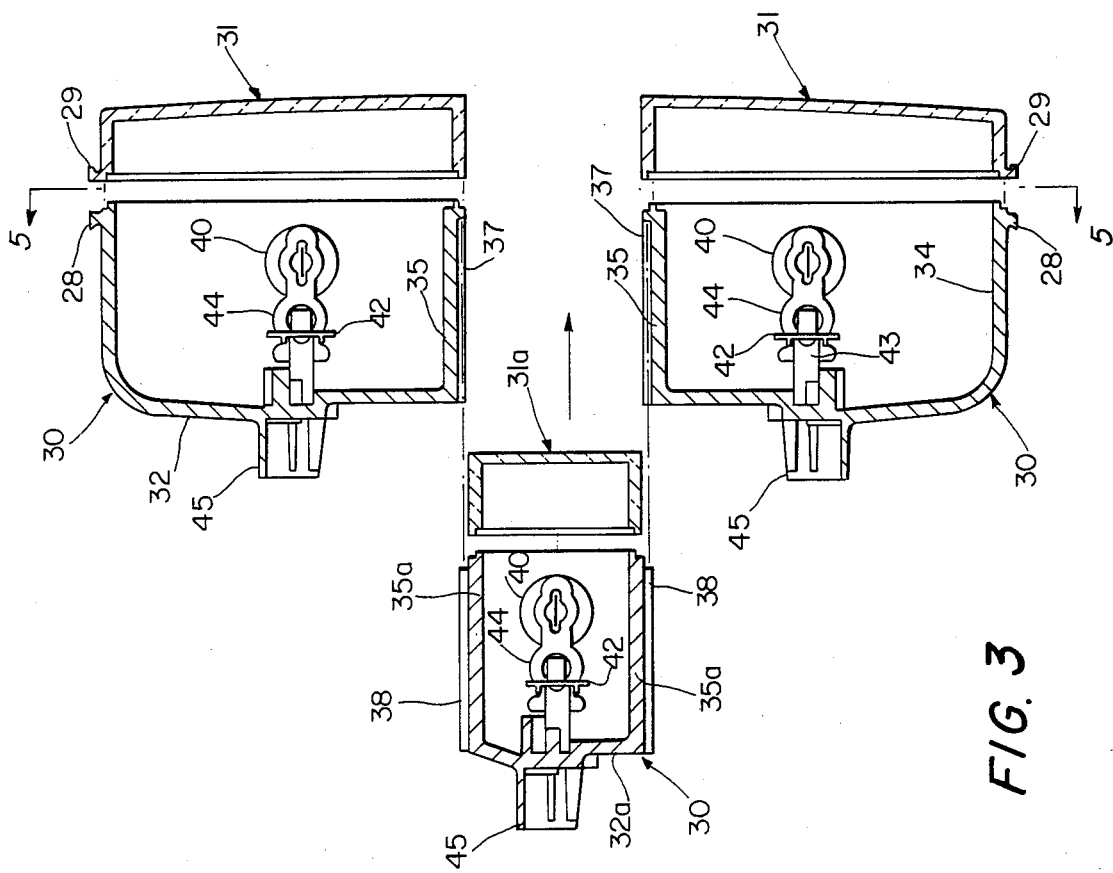
FIG. 5
FIG. 3

MODULAR SHOCK RESISTANT/SEALED MULTI-FUNCTION LAMP

BACKGROUND AND OBJECTS OF THE INVENTION

The present invention relates in general to multi-function lamps for automotive vehicles, particularly commercial vehicles such as trucks, trailers and the like, and more particularly to an improved modular type multiple functional lamp having plural interchangeable lamp modules which are hermetically sealed and have shock mounted lamp bulbs, combined in a multi-function lamp assembly in various combinations, providing longer life and lower maintenance characteristics. In the past, a number of arrangements have been proposed for shock mounting incandescent lamp bulbs for the lamp housings to be employed on motor vehicles, particularly trucks and similar commercial vehicles and trailers, to reduce road shock and vibration effects on the filaments of the bulbs. It will be appreciated by persons familiar with the art that commercial trucks, trailers and similar commercial vehicles are subject to recurrent road shocks in traveling over the highway and off road paths. These road shocks, transmitted through the frame of the vehicle, adversely effect the relatively fragile filaments of the lamp bulbs in the various function lamp units, such as marker lamps, signalling lamps, driving lamps, and back-up lamps of the vehicle, so that frequent breakage or disabling of the bulbs occurs due to the road shocks.

Baseless cartridge lamps have been developed in recent years as a type of truck vehicle lamp construction designed to avoid the great expense in manufacture of the base portions of the more traditional types of lamp bulbs, such as the screw or bayonet base types, and because of the number of advantages arising from the baseless cartridge lamp construction. In addition, to the savings and mass producing such items, such as in the assembly of baseless type cartridge bulbs with connectors for reliable and convenient mounting of the bulbs, the nature of the baseless cartridge bulb construction offers increased resistance to severe vibration and heavy shock loads, and permits use of reduced voltage levels needed to supply the bulb filament, which results in increasing filament light. A mount which has been found to be highly satisfactory for mounting such baseless cartridge bulbs in a shock mount arrangement providing increased life in the hostile environment of commercial truck and trailer lamp applications, permitting use of such bulbs in marker lamp, signaling lamp, driving lamp and back-up lamp applications, it shown in earlier U.S. Pat. No. 4,437,145 granted to the assignor of the present application.

An object of the present invention is the provision of a novel modular type of shock mounted and sealed multi-function lamp assembly for commercial truck, trailer and similar vehicle applications where the lamp may be subject to severe vibration, shock and heat problems, wherein a plurality of modular sub-assemblies each comprising a shock mounted baseless cartridge bulb and housing and lens elements are combined in interlocked relation in a plural modular sub-assembly housing having three independent lamps which are shock mounted. Each modular lamp sub-assembly may be replaced separate from the other lamp sub-assemblies, and the three modular sub-assemblies are arranged in vertically spaced adjoining relationship wherein the upper and lower modular sub-assemblies are symmetrical and may be assembled in various combinations. Also, like modular sub-assembly units designed for various lamp functions may be provided permitting choice of various combinations of multi-function lamps in the plural assembly of modular sub-assemblies.

Also, many lamps previously provided for truck, trailer or similar commercial vehicular use have not been provided with effective hermetic sealing, which leads to corrosion and leakage causing early bulb and/or internal wire failure. This makes the lamp a high maintenance item which is the cause of considerable expense in insuring that proper effective lamps are provided for the various functions required on truck and trailer vehicles. Another object of the present invention is the provision of a novel multi-function shock mounted lamp unit of plural modular lamp sub-assemblies as previously described, wherein each of the lamp sub-assemblies are hermetically sealed, by sonic, hot platen, or induction welding, providing effective protection against corrosion and leakage problems.

Other objects, advantages and capabilities of the present invention will be apparent from the following detailed description, taken in conjunction with the accompanying drawings illustrating a preferred embodiment of the invention.

BRIEF DESCRIPTION OF THE FIGURES

FIG. 2 is a front elevational view thereof;

FIG. 3 is an exploded vertical section view of the three modular lamp sub-assemblies in the embodiment shown in FIGS. 1 and 2;

FIG. 4 is a vertical section view showing the three modular sub-assemblies assembled in the multi-function lamp assembly cover as an assembled unit, taken along the line 4—4 of FIG. 2;

FIG. 5 is a vertical section view through the 3 modular sub-assemblies shown in FIG. 3, taken along the line 5—5 of FIG. 3, with the 3 modules exploded vertically from each other;

DETAILED DESCRIPTION OF A PREFERRED EMBODIMENT

Figure 1:
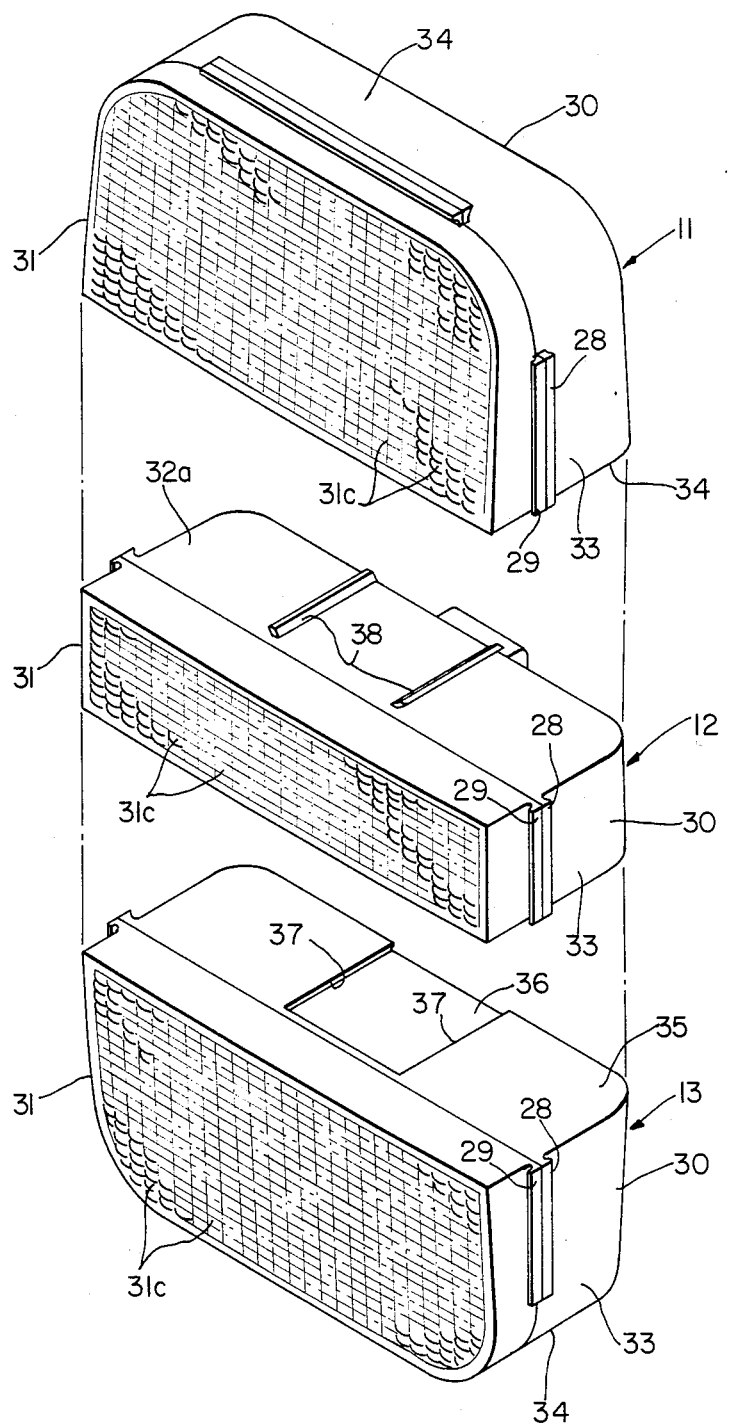
FIG. 1 is an exploded perspective view of a multi-function lamp assembly formed of plural modular sealed and shock amounted lamp sub-assemblies embodying the present invention.
Figure 6:
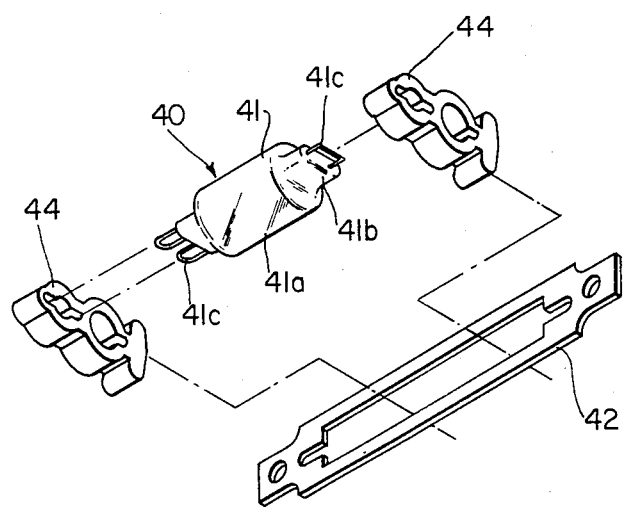
FIG. 6 is an exploded perspective view of the baseless bulb and its shock mount.

Referring to the drawings wherein like reference characters designate corresponding parts throughout the several figures, the multi-function lamp assembly of the present invention is indicated generally by the reference character 10, and comprises three shock mount type hermetically sealed lamp modules, indicated generally at 11, 12 and 13 in FIG. 1, which are to be removably assembled together in a multiple lamp housing 14. The housing 14, as best illustrated in FIGS. 2 and 5, comprises a generally box-like, cup shaped housing, preferably formed of molded thermo-plastic rubber, molded plastic or metal stamping, having a vertical transverse wall, here termed a back wall 15, vertical side walls 16, 17 and horizontal top and bottom walls 18 and 19 joined together along smooth curved corners, such as the curved corner portions 20 where the side walls 16, 17 and top and bottom walls 18, 19 merge into each other, and by convexly curved wall portions 21 where the side, top and bottom walls 16–19 merge into the vertical rear wall 15. The side, top and bottom walls 16–19, and back wall 15, define a large outwardly opening cavity or well 22, which is sufficiently large in a transverse direction to accommodate the three lamp modules 11, 12 and 13 and has a depth greater than the depth of the modules from their lens portions, here termed the front of the assembly, to the rearwardly projecting ends of the cable plug coupling formations of the lamp modules 11–13, to accommodate the three lamp modules in nested relation therein. The rear or back wall 15 of the lamp assembly housing 14 has a support plate 23 mounted flush against the rear wall 15 of the housing 14, as, for example, by rivets 24, which is formed for example as a molded plastic or metal stamping plate, and which may include clench or weld studs, or rearwardly projecting threaded fasteners, as indicated at 25, placed in a desired pattern for mounting the lamp assembly to the vehicle. The front lip portions of the side, top and bottom walls, 16–19, which are shown near the right hand edge of the housing 14 in FIG. 4, are provided with a generally channel shaped groove or recessed 26 bounded by a beveled lip formation 27, to facilitate insertion and reception of interlocking or fastening rib formations 28, 29 of the respective modules as later described.

The shock mount lamp modules 11, 12 and 13 which are appropriately colored or designed for Stop, Turn, Tail, Clearance, and License lamp functions, each comprise a housing portion 30 of generally cup shaped configuration and a lens 31 hermetically sealed to the module housing 30. The housing 30 for each of the modules 11, 12 and 13 may also be formed of molded plastic or metal stamping or molded thermoplastic rubber, shaped to provide a module back wall 32, generally vertical side walls 33, and horizontal walls 34 and 35 which serve as either top or bottom walls of the module, depending on orientation of the module, joined to the side walls 33 and back wall 32, along curved joining portions. The upper and lower lamp modules 11 and 13 are symmetrical so that they can be used in both top and bottom locations, and the lenses 31 for the modules 11 and 13 are also symmetrical in shape and optics and can be used for all lamp functions. The lenses 31 for the lamp modules 11 and 13 are molded plastic in red and amber colors, and are joined to their associated housings 30 at the front edges of the vertical and horizontal walls 33–35 of the housings to create a hermetic seal by means of vibration, sonic, hot platen or induction welding. Once the lenses 31 for the top and bottom modules 11, 13 are joined to their respective module housings, they will have color and function combinations determined by the combinations of lens colors and placement of the colored lens lamp modules in the manner well understood by persons skilled in the art. For example, an amber or yellow lens will function as Turn and Warning light only, and the red lens will serve as Stop and Tail Light, where a yellow lens and a red lens module are combined in the lamp assembly. Where two lens modules are combined, one red lens module will surve as a Turn, Warning and Clearance lamp while the other red lens module will serve as a Stop and Tail Lamp. These combinations may be mounted in 3 arrangements, either with a yellow top and red bottom or vice versa, or with a red top over a red bottom.

The middle module 12 differs in configuration from the upper and lower symmetrical modules 11 and 13, in that its housing, here indicated as 32a and its lens 31a are rectangular in front and rear elevation, and are of shorter vertical dimensions than the vertical dimensions of the modules 11 and 13. The center module 12 is designed to be disposed between and in abutment with the top and bottom modules 11 and 13, and has flat horizontal upper and lower walls 35a adapted to abut against the confronting flat horizontal walls 35 of the housings 30 for the upper and lower modules 11 and 13 in the assembled condition within the assembly housing 14. The lens 31a of the center module 12 is a clear molded plastic, to serve Back-up light functions, and is joined to its associated module housing 32a in hermetical sealed relation in the same manner as the lenses 31 are jointed to their associated housings 32 in the upper and lower modules 11, 13.

The lenses 31 and 31a have rearwardly extending flange portions, indicated for example at 31b, adapted to register at their rear edges with and be joined along hermit seals with a walls 33, 34, 35 and 35a of their associated module housings and include outwardly projecting interlock or fastening rib formations 29 located adjacent and coactive with coextensive and substantially corresponding protruding rib formations 28 projecting from the side walls 33 of the three modules and from the horizontal wall 34 of the upper and lower modules 11 and 13, to be received in the channel shaped groove 26 of the assembly housing walls 16–19 for retaining the modules in position within the assembly housing 14. The wall portions of the assembly housing 14 containing the channel shaped groove 26 are sufficiently deformable to be flexed outwardly by the protruding rib formations 28, 29 of the three modules when they are assembled together in the desired combination and collectively forced rearwardly against the beveled lip formations 27 to permit the rib formations 28, 29 to snap into the channel shape retaining grooves 26 for securing the modules 11, 12 and 13 in assembled relation within the assembly housing 14.

The three modules 11, 12 and 13 are assembled together by means of interlocking inclined or dove tail tongue and groove formations best shown in FIGS. 1 and 5. As will be apparent from these figures, the flat horizontal wall 35 of the upper and lower modules 11, 13 which are to be in abutting confronting relation to the center module 12 are provided with a dovetail interlocking recess 36 having inclined sides 37 which extend along outwardly convergent planes as shown in FIG. 5. The flat upper and lower horizontal walls 35a of the center module 12 have outwardly protruding inclined interlocking tongues 38 positioned to interfit in and slidingly abut the included sides 37 of the dovetail recesses 36 in the confronting surfaces of adjacent proximate walls 35 of the modules 11 and 13 to hold the three modules 11, 12 and 13 in assembled relation to each other. Upon forcing of the interconnected modules 11, 12, 13 into the assembly housing 14, the three modules are held together by the walls 16–19 serving as a restraining surround about the assembled modules, when the rib formations 28, 29 are snapped into the channel shaped groove 26.

Figure 7:
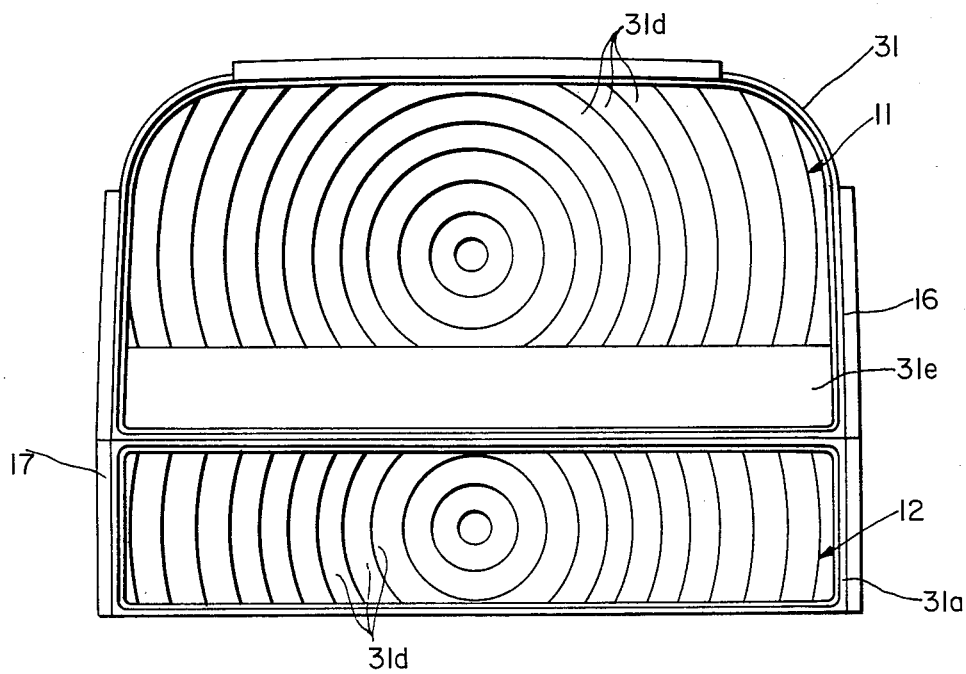
FIG. 7 is a fragmentary rear view of the lenses for the upper and middle modular sub-assemblies, the rear view of the bottom lens being the same as that of the top lens.
Figure 8:
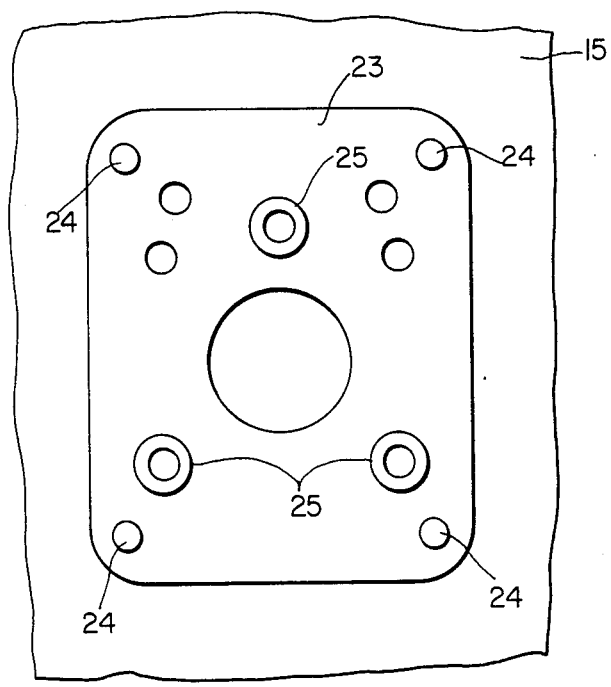
FIG. 8 is a fragmentary section view taken along the line 8—8 of FIG. 4, showing the mounting plate in front elevation.

In the preferred embodiment, the outer surfaces of the lenses 31, 31a for the three modules 11, 12 and 13 are provided with pillow optics 31c along the exterior surface, as is illustrated in FIG. 1, and the inner surfaces of the lenses 31 for the three modules are provided with ring optics 31d as indicated in FIG. 7. Also, the inner surface of the lenses 31 for the upper and lower modules 11 and 13 may be provided with a band of reflex optics 31e, to produce a highly reflective band adjacent the flat horizontal wall 35 of the modules 11, 13.

Each of the modules is provided with a baseless cartridge type bulb 40, for example, of the type manufactured by Wagner Electric Corporation as the Wagner No. 571 cartridge bulb, having the construction disclosed, for example, in U.S. Pat. No. 4,061,940. As illustrated and disclosed in that patent, the baseless cartridge bulb primarily comprises a glass envelope 41 having a center portion 41a of substantially cylindrical configuration and two opposite, reduce diameter unbiased ends, one of which is shown at 41b, processed to hermetically seal about filament support pins 41c so that the glass rigidly supports the internal and external portions of the filament support pins in fixed spatial relationship to each other without need for continued external support. The filament support pins are electrically connected to and support or two filaments, for example, a major filament and a minor filament, so as to provide dual filament functions of high intensity illumination and low intensity or dim signalling functions. Alternatively, the bulb may be of the type having a single filament wire providing a single level of illumination for certain well-known functions.

The baseless cartridge type bulb 40 is supported by a shock mount assembly which is generally of the type disclosed in earlier U.S. Pat. No. 4,437,145, wherein a mounting strap 42, for example stamped from sheet metal, provides a combination mounting plate and heat shield, which is of somewhat different configuration from the mounting plate shown in said earlier U.S. Pat. No. 4,437,145, but which is secured to mounting post formations 43 protruding forwardly from the back wall 32 of each module housing and secured thereto at opposite ends of the mounting strap. The mounting strap 42 has a pair of mounting arm-receiving slot portionss to receive neck portions of shock mounting arms 44 formed of silicon rubber and dimensioned to be long enough and of appropriate flexibility to prevent bulb contact with the surfaces of the housing member and effect good shock isolation of the bulb, corresponding to the shock mounting arms indicated by reference characters 27 and 28 in said earlier U.S. Pat. No. 4,437,145.

Figure 9:
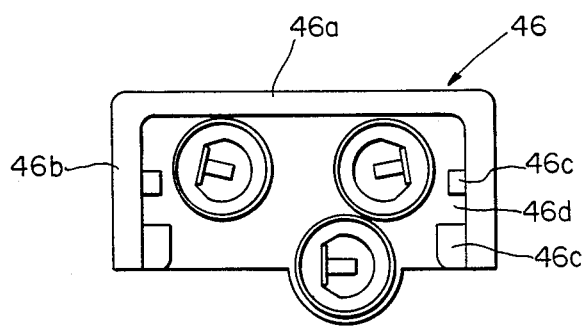
FIG. 9 is a rear elevational view of the rear connector formation adapted to receive a connector plug for establishing electrical connections to the lamps.

Also protruding from the rear walls 32, 32a of the modules 11, 12 and 13 is a cable plug coupling formation 45, which in rear elevation has the appearance shown in FIG. 9, providing an inverted U-shaped shroud 46 having a top wall portion 46a and depending side wall portions 46b each provided with rib formations 46c to define a slide channel 46d therebetween for receiving a tongue formation projecting from opposite sides of a three-connector cable plug of known commercial construction for connecting the electrical wiring portions of each module to the lamp controlling cables of the associated truck or vehicle.

I claim:

1. A modular multi-function lamp assembly of plural shock mount lamps for automotive vehicles, such as trucks, trailers and the like, made up of interchangeable lamp modules, comprising a generally cup-shaped assembly housing having a back wall and adjoining side walls defining an outwardly opening cavity for receiving a plurality of individual lamp modules in a vertical stacked array aligned with each other, and nested within the cavity, each module comprising a module case member having sides and a lens member hermetically sealed at the periphery of the lens member to the sides of the case member defining a sealed enclosure, a lamp bulb and shock mount therefore in each such enclosure, the case member of each module including at least one side forming a flat planiform abutment wall to be disposed in a horizontal transverse position within said cavity to be disposed in confronting abutment with a paired companion like abutment wall of an adjacent one of said modules, said abutment walls which are in paired companion relationship having interlocking formations to restrain them in assembled together abutting relationship, and said modules having outwardly protruding rib formations along exterior surfaces of opposite sides thereof adjoining said abutment walls thereof, and side walls of said assembly housing confronting said opposite sides of said modules having recessed channel means and being flexibly deformable sufficient to be flexed to accommodate insertion movement of said modules inwardly of the housing to positions interposing said rib formations into said channel means for holding the modules in said housing.

2. A modular multi-function lamp assembly as defined in claim 1 wherein said side walls of said housing have a lip portion terminating in an outer edge defining a surround about an entrance opening for said cavity having said recessed channel means located inwardly adjacent said outer edge, the lip portion between said outer edge and said channel means having a beveled surface facilitating insertion of the modules into nested relation in said cavity.

3. A modular multi-function lamp assembly as defined in claim 1, wherein said modules form an array of three vertically aligned modules within the cavity providing a center module and upper and lower modules, the upper and lower modules being alike and in inverted relation to each other.

4. A modular multi-function lamp assembly, as defined in claim 2, wherein said modules form an array of three vertically aligned modules within the cavity providing a center module and upper and lower modules, the upper and lower modules being alike and in inverted relation to each other and having said outwardly protruding rib formation on opposite vertical sides of the associated module and on a horizontal side thereof opposite said abutment wall thereof, disposing such rib formations at the top of the upper module and the bottom of the lower module.

5. A modular multi-function lamp assembly, as defined in claim 2, wherein said modules form an array of three vertically aligned modules within the cavity providing a center module and upper and lower modules, the upper and lower modules being alike and in inverted relation to each other and having said outwardly protruding rib formation on opposite vertical sides of the associated module and on a horizontal side thereof opposite said abutment wall thereof, disposing such rib formations at the top of the upper module and the bottom of the lower module, and said recessed channel means extending as a continuous inwardly facing channel in the lip portions of said sidewalls defining said surround for receiving the rib formations at said top and bottom and the rib formations along the vertical sides of the modules.

6. A modular multi-function lamp assembly as defined in claim 1, wherein said sides of said modules have said outwardly protruding rib formations on opposite vertical sides of the associated module and some of said modules also have said rib formations on a horizontal side thereof opposite said abutment wall thereof.

7. A modular multi-function lamp assembly as defined in claim 1, wherein said sides of said modules have said outwardly protruding rib formations on opposite vertical sides of the associated module and some of said modules also have said rib formations on a horizontal side thereof opposite said abutment wall thereof and said recess channel means extending as a continuous inwardly facing channel in the lip portions of said side walls defining said surround for receiving the rib formations at said top and bottom and the rib formations along the vertical sides of the modules.

8. A modular multi-function lamp assembly as defined in claim 1, wherein said abutment walls of one of said modules of the plural modules in the array nested in said housing comprise horizontal upper and lower parallel flat planiform walls have interlocking formations protruding therefrom defining a pair of oppositely facing inclined, outwardly diverging interlock surfaces, and the paired companion abutment walls of the modules in said array disposed adjacent to said one module having dovetail recesses therein forming the interlock formations thereof providing inwardly diverging inclined side surfaces to be disposed in sliding abutment with the inclined surfaces of said interlock formations of said one module to restrain the same in interlocked relation with each other.

9. A modular multi-function lamp assembly as defined in claim 2, wherein said abutment walls of one of said modules of the plural modules in the array nested in said housing comprise horizontal upper and lower parallel flat planiform walls have interlocking formations protruding therefrom defining a pair of oppositely facing inclined, outwardly diverging interlock surfaces, and the paired companion abutment walls of the modules in said array disposed adjacent to said one module having dovetail recesses therein forming the interlock formations thereof providing inwardly diverging inclined side surfaces to be disposed in sliding abutment with the inclined surfaces of said interlock formations of said one module to restrain the same in interlocked relation with each other.

10. A modular multi-function lamp assembly as defined in claim 3, wherein said abutment walls of one of said modules of the plural modules in the array nested in said housing comprise horizontal upper and lower parallel flat planiform walls have interlocking formations protruding therefrom defining a pair of oppositely facing inclined, outwardly diverging interlock surfaces, and the paired companion abutment walls of the modules in said array disposed adjacent to said one module having dovetail recesses therein forming the interlock formations thereof providing inwardly diverging inclined side surfaces to be disposed in sliding abutment with the inclined surfaces of said interlock formations of said one module to restrain the same in interlocked relation with each other.

11. A modular multi-function lamp assembly as defined in claim 4, wherein said abutment walls of one of said modules of the plural modules in the array nested in said housing comprise horizontal upper and lower parallel flat planiform walls have interlocking formations protruding therefrom defining a pair of oppositely facing inclined, outwardly diverging interlock surfaces, and the paired companion abutment walls of the modules in said array disposed adjacent to said one module having dovetail recesses therein forming the interlock formations thereof providing inwardly diverging inclined side surfaces to be disposed in sliding abutment with the inclined surfaces of said interlock formations of said one module to restrain the same in interlocked relation with each other.

12. A modular multi-function lamp assembly as defined in claim 5, wherein said abutment walls of one of said modules of the plural modules in the array nested in said housing comprise horizontal upper and lower parallel flat planiform walls have interlocking formations protruding therefrom defining a pair of oppositely facing inclined, outwardly diverging interlock surfaces, and the paired companion abutment walls of the modules in said array disposed adjacent to said one module having dovetail recesses therein forming the interlock formations thereof providing inwardly diverging inclined side surfaces to be disposed in sliding abutment with the inclined surfaces of said interlock formations of said one module to restrain the same in interlocked relation with each other.

13. A modular multi-function lamp assembly as defined in claim 6, wherein said abutment walls of one of said modules of the plural modules in the array nested in said housing comprise horizontal upper and lower parallel flat planiform walls have interlocking formations protruding therefrom defining a pair of oppositely facing inclined, outwardly diverging interlock surfaces, and the paired companion abutment walls of the modules in said array disposed adjacent to said one module having dovetail recesses therein forming the interlock formations thereof providing inwardly diverging inclined side surfaces to be disposed in sliding abutment with the inclined surfaces of said interlock formations of said one module to restrain the same in interlocked relation with each other.

14. A modular multi-function lamp assembly as defined in claim 7, wherein said abutment walls of one of said modules of the plural modules in the array nested in said housing comprise horizontal upper and lower parallel flat platform walls have interlocking formations protruding therefrom defining a pair of oppositely facing inclined, outwardly diverging interlock surfaces, and the paired companion abutment walls of the modules in said array disposed adjacent to said one module having dovetail recesses therein, forming the interlock formations thereof providing inwardly diverging inclined side surfaces to be disposed in sliding abutment with the inclined surfaces of said interlock formations of said one module to restrain the same in interlocked relation with each other.

15. A modular multi-function lamp as defined in claim 3, wherein said center module is of rectangular outline providing two vertical sides having said rib formations protruding therefrom and having two horizontal sides defining a pair of parallel top and bottom surfaces defining a pair of said abutment walls at the top and bottom of said center module.

16. A modular multi-function lamp as defined in claim 4, wherein said center module is of rectangular outline providing two vertical sides having said rib formations protruding therefrom and having two horizontal sides defining a pair of parallel top and bottom surfaces defining a pair of said abutment walls at the top and bottom of said center module.

17. A modular multi-function lamp as defined in claim 5, wherein said center module is of rectangular outline providing two vertical sides having said rib formations protruding therefrom and having two horizontal sides defining a pair of parallel top and bottom surfaces defining a pair of said abutment walls at the top and bottom of said center module.

18. A modular multi-function lamp assembly as defined in claim 3, wherein the center module of said array has a clear transparent lens, and the lenses of said upper and lower modules are a red lens or an amber lens.

19. A modular multi-function lamp assembly as defined in claim 4, wherein the center module of said array has a clear transparent lens, and the lenses of said upper and lower modules are a red lens or an amber lens.

20. A modular multi-function lamp assembly as defined in claim 5, wherein the center module of said array has a clear transparent lens, and the lenses of said upper and lower modules are a red lens or an amber lens.

* * * * *